United States Patent
Suwa et al.

(10) Patent No.: US 7,300,595 B2
(45) Date of Patent: Nov. 27, 2007

(54) METHOD FOR FILLING CONCAVE PORTIONS OF CONCAVO-CONVEX PATTERN AND METHOD FOR MANUFACTURING MAGNETIC RECORDING MEDIUM

(75) Inventors: Takahiro Suwa, Tokyo (JP); Kazuhiro Hattori, Tokyo (JP); Shuichi Okawa, Tokyo (JP); Mikiharu Hibi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/015,670

(22) Filed: Dec. 20, 2004

(65) Prior Publication Data

US 2005/0199581 A1 Sep. 15, 2005

(30) Foreign Application Priority Data

Dec. 25, 2003 (JP) ............... 2003-430435

(51) Int. Cl.
*B44C 1/22* (2006.01)
(52) U.S. Cl. .............. 216/22; 216/38; 216/39; 216/66; 216/72
(58) Field of Classification Search ........ None
See application file for complete search history.

(56) References Cited

U.S. PATENT DOCUMENTS

| | | | | |
|---|---|---|---|---|
| 4,416,056 A | * | 11/1983 | Takahashi | 29/603.24 |
| 4,676,868 A | * | 6/1987 | Riley et al. | 438/697 |
| 4,806,504 A | * | 2/1989 | Cleeves | 438/699 |
| 5,073,508 A | * | 12/1991 | Villalon | 438/314 |
| 5,119,231 A | * | 6/1992 | Nelson et al. | 359/359 |
| 5,182,624 A | * | 1/1993 | Tran et al. | 257/40 |
| 5,235,195 A | * | 8/1993 | Tran et al. | 257/59 |
| 5,246,799 A | * | 9/1993 | Pierrat | 430/4 |
| 5,246,801 A | * | 9/1993 | Pierrat | 430/5 |
| 5,273,910 A | * | 12/1993 | Tran et al. | 438/69 |
| 5,277,960 A | * | 1/1994 | Tsuya et al. | 428/846.4 |
| 5,552,346 A | * | 9/1996 | Huang et al. | 438/699 |
| 6,014,296 A | | 1/2000 | Ichihara et al. | |
| 6,140,216 A | * | 10/2000 | Richart et al. | 438/592 |
| 6,243,525 B1 | * | 6/2001 | Luizink et al. | 385/132 |
| 6,305,072 B1 | * | 10/2001 | Yoda et al. | 29/603.14 |
| 6,586,044 B1 | | 7/2003 | Takeshita et al. | |
| 2002/0050776 A1 | * | 5/2002 | Kubota et al. | 313/309 |

(Continued)

FOREIGN PATENT DOCUMENTS

JP A-02-036529 2/1990

(Continued)

*Primary Examiner*—Allan Olsen
(74) *Attorney, Agent, or Firm*—Oliff & Berridge, PLC

(57) ABSTRACT

A method for filling concave portions of a concavo-convex pattern by which the concave portions of the concavo-convex pattern can be filled to flatten the surface with reliability, and a method for manufacturing a magnetic recording medium by which a magnetic recording medium having a magnetic recording layer of concavo-convex pattern with a sufficiently flat surface can be manufactured efficiently. A filler for filling the concave portions is deposited over the surface of an object to be processed, the object being provided with a concavo-convex pattern. A cladding is further deposited over the filler. Then, an excess part of the filler and the cladding above the surface of the object are removed for flattening, by using a dry etching method having a lower etching rate to the cladding than to the filler.

16 Claims, 11 Drawing Sheets

U.S. PATENT DOCUMENTS

| | | | |
|---|---|---|---|
| 2002/0072237 A1* | 6/2002 | Bowles et al. | 438/690 |
| 2005/0086795 A1* | 4/2005 | Suwa et al. | 29/603.01 |

FOREIGN PATENT DOCUMENTS

| JP | A-02-280326 | 11/1990 |
|---|---|---|
| JP | A-03-040219 | 2/1991 |
| JP | A-06-053189 | 2/1994 |
| JP | A-09-097419 | 4/1997 |
| JP | A 9-97419 | 4/1997 |
| JP | A-10-275808 | 10/1998 |
| JP | A-11-260772 | 9/1999 |
| JP | A-2000-195042 | 7/2000 |
| JP | A-2001-167420 | 6/2001 |
| JP | A-2001-267422 | 9/2001 |
| JP | A-2002-026117 | 1/2002 |
| JP | A-2002-515647 | 5/2002 |
| JP | A-2003-157520 | 5/2003 |

* cited by examiner

METHOD FOR FILLING CONCAVE PORTIONS OF CONCAVO-CONVEX PATTERN AND METHOD FOR MANUFACTURING MAGNETIC RECORDING MEDIUM

BACKGROUND OF THE INVENTION

1. Field of the Invention

The present invention relates to a method for filling concave portions of a concavo-convex pattern which is used in the field of manufacturing of, for example, semiconductors and information recording media, and a method for manufacturing a magnetic recording medium having a recording layer of concavo-convex pattern.

2. Description of the Related Art

Conventionally, a method for filling concave portions of a concavo-convex pattern has been used widely, in which a filler for filling concave portions is deposited over the surface of an object to be processed having a concavo-convex pattern and an excess part of the filler above the surface are removed for flattening (for example, see National Publication of PCT application No. 2002-515647).

To take an example, in the field of manufacturing of a semiconductor product, such a filling method is used to implant an insulator into a predetermined pattern of grooves (concave portions) formed in the surface.

In the field of manufacturing of magnetic recording media including a hard disc, the use of such a filling method has also been expected because of the following circumstances. Magnetic recording media have been improved in areal density significantly through such improvements as finer magnetic particles for constituting the recording layers, material modifications, and finer head processing. Although further improvements in areal density are expected in the future, there have arisen problems including limitations on head processing, erroneous information recording onto tracks adjacent to a target track of recording due to spreading of a recording magnetic field, and crosstalk. The improvement of the areal density by conventional modification techniques is thus approaching its limit.

In the meantime, discrete track media and patterned media have been proposed as prospective magnetic recording media capable of further improvements in areal density (for example, see Japanese Patent Laid-Open Publication No. Hei 9-97419). The discrete track media are ones in which the magnetic recording layer is formed in a concavo-convex pattern and the recording elements are divided in the radial direction. The patterned media are ones in which the recording elements are divided in the radial and circumferential directions. In a hard disc and other magnetic recording media, surface flatness is of importance in order to stabilize the head flying height. It is thus expected to flatten the surface of the magnetic recording layer by filling a nonmagnetic filler into concave portions between the recording elements by using the filling method described above.

The filler can be deposited by using such deposition techniques as sputtering, CVD (Chemical Vapor Deposition), and IBD (Ion Beam Deposition).

Moreover, the flattening can be effected by using such a processing technique as CMP (Chemical Mechanical Polishing).

Nevertheless, CMP has the problem of requiring much time and cost for cleaning and the like in order to remove slurry. Besides, CMP is a wet process. This has produced the problem that CMP, when combined with dry processes such as the step of processing a concavo-convex pattern, can complicate object transportation with a drop in the efficiency of the entire manufacturing steps. That is, the use of CMP in the flattening step has caused the problem of lower production efficiency.

SUMMARY OF THE INVENTION

In view of the foregoing problems, various exemplary embodiments of this invention provide a method for filling concave portions of a concavo-convex pattern by which the concave portions of the concavo-convex pattern can be filled to flatten the surface efficiently with reliability, and a method for manufacturing a magnetic recording medium by which a magnetic recording medium having a magnetic recording layer of concavo-convex pattern with a sufficiently flat surface can be manufactured efficiently.

Various exemplary embodiments of this invention solve the foregoing problems by depositing a filler for filling concave portions over a surface of an object to be processed, the object being provided with a concavo-convex pattern; further depositing a cladding over the filler; and then removing an excess part of the filler and the cladding above the surface of the object to be processed for flattening by using a dry etching method having a lower etching rate to the cladding than to the filler.

When the filler is deposited over the surface of the concavo-convex patterned object to be processed, the surface of the filler also forms a concavo-convex shape along the concavo-convex pattern on the surface of the object. For flattening, the filler is removed at the surface while the concavities and convexities are flattened gradually. Thus, the flattening sometimes cannot flatten the concavities and convexities at the surface of the deposited filler sufficiently if the surface concavities and convexities are large.

Then, the inventors initially attempted to flatten the surface of the filler by using dry etching such as ion beam etching. The use of the dry etching, not a wet process such as CMP, could eliminate the need for slurry cleaning and the like, and also improve the efficiency of the entire manufacturing steps when combined with other dry processes. In addition, dry etching typically tends to remove convex portions selectively faster than concave portions. The surface flattening effect was thus considered to be high.

Nevertheless, while the dry etching could be used to improve the production efficiency, it was difficult to reduce differences in surface level to a desired degree. The reasons are not quite clear, but are considered generally as follows:

While the dry etching tends to remove surface convex portions selectively faster than concave portions, the etching rate can also vary when the convex portions have different widths. Here, the width of a convex portion shall refer to a minimum width among widths of the convex portion near the top, as taken in directions generally perpendicular to the height direction. For example, take the case shown in FIG. 16A where convex portions 102 have relatively greater widths among the convex portions of the filler. Here, the vicinities of the ends alone are removed faster while the inner portions lag behind the ends in being removed. This means lower etching rates. On the other hand, the convex portions 104 as shown in FIG. 16A, having relatively smaller widths among the convex portions of the filler, are removed relatively faster, even including the inner portions. This means higher etching rates.

Moreover, a region 106 containing many convex portions 102 that have relatively greater widths and lower etching rates tends to have a lower etching rate on the average in terms of the entire region including the concave portions around the convex portions 102. Meanwhile, a region 108 containing many convex portions 104 that have relatively smaller widths and higher etching rates tends to have a higher etching rate on the average in terms of the entire region including the concave portions around the convex portions 104. Consequently, when the process conditions are adjusted to one single region, there can occur differences in surface roughness and/or in level between the regions with the progress of the etching as shown in FIGS. 16B to 16D.

Even if the convex portions lying in a region on the surface of the object to be processed (under the filler) have generally the same widths, the intervals between the convex portions decrease as the areal ratio of occupation of the convex portions to the entire region increases. The convex portions of the filler deposited thereon tend to be sharper, thereby increasing the average etching rate of the entire region.

Since the surfaces of actual objects to be processed often have irregular concavo-convex patterns, there can occur differences in the etching rate between regions to cause differences in surface roughness and in level between the regions. For example, a magnetic recording medium having a magnetic recording layer of concavo-convex pattern, such as a discrete track medium and a patterned medium, is sectioned into data areas and servo areas in use. Even if the magnetic recording layer has a generally uniform concavo-convex pattern in the data areas, the concavo-convex pattern differs significantly between the data areas and the servo areas. Besides, inside the servo areas, the magnetic recording layer often has a complicated concavo-convex pattern corresponding to the pattern of servo information. This can cause differences in surface roughness between the data areas and the servo areas, and differences in level between those regions, for example.

Then, the inventors have made intensive studies further, and finally achieved the present invention. More specifically, a filler is deposited over the surface of a object to be processed, the object being provided with a concavo-convex pattern, and a cladding is further deposited over the filler. Then, an excess part of the filler and the cladding above the surface are removed to flatten the surface by using a dry etching method having a lower etching rate to the cladding than to the filler. As a result, in a region containing convex portions that have relatively smaller widths and higher etching rates, the cladding constituting the convex portions is removed relatively faster, and the filler having a higher etching rate than that of the cladding is exposed. The convex portions are thus removed to the level of the concave portions quickly. As shown by the curve designated by the reference symbol A in FIG. 17, the average etching rate of the entire region immediately after the start of the flattening is high. The convex portions disappear or become significantly smaller in the relatively early stages. Since the convex portions having higher etching rates disappear or become significantly smaller, the average etching rate of the entire region decreases in the relatively early stages after the start of the flattening.

On the other hand, in a region containing many convex portions that have relatively greater widths and lower etching rates, the average etching rate of the entire region immediately after the start of the flattening is low as shown by the curve designated by the reference symbol B in FIG. 17. Since the convex portions remain relatively longer, the average etching rate of the entire region will not vary much. When the cladding near the ends of the convex portions is removed to expose the filler, the exposed filler having a higher etching rate is etched. This removes the filler and the cladding over the filler in the vicinities of the ends, so that the convex portions become gradually narrower with a decrease in area. That is, since the convex portions remain and decrease in area, the average etching rate of the entire region increases with some delay after the start of the flattening. Incidentally, when most of the cladding constituting the convex portions is removed, the convex portions are removed to the level of the concave portions quickly. The concavities and convexities thus disappear or become significantly smaller to lower the etching rate of the entire region.

The areas inside the curves designated by the reference symbols A and B in FIG. 17 (the areas surrounded by the respective curves and the vertical and horizontal axes of the graph) correspond to the average amounts of process of the respective regions. The difference between the two areas is considered to decrease with time, thereby suppressing differences in surface roughness and in level between the regions.

Moreover, even if two regions contain convex portions of generally the same widths and the areal ratios of occupation of the convex portions to the entire regions are different, differences in surface roughness and in level between the regions are suppressed.

In a region where the areal ratio of occupation of the convex portions to the entire region is relatively high, the average etching rate of the entire region is relatively high immediately after the start of the flattening as shown by the curve designated by the reference symbol C in FIG. 18. The convex portions disappear or become significantly smaller in the relatively early stages. Since the convex portions having higher etching rates disappear or become significantly smaller, the average etching rate of the entire region decreases in the relatively early stages after the start of the flattening. Here, the cladding having an etching rate lower than that of the filler remains inside concave portions and can contribute to the suppression of changes in the etching rate. Nevertheless, the concave portions are low in the areal ratio of occupation, and thus the degree of decrease of the etching rate becomes greater accordingly.

On the other hand, in a region where the areal ratio of occupation of the convex portions to the entire region is relatively low, the average etching rate of the entire region is relatively low immediately after the start of the flattening as shown by the curve designated by the reference symbol D in FIG. 18. The convex portions disappear or become significantly smaller with a delay after the start of the flattening, so that the average etching rate of the entire region decreases further. The degree of decrease of the etching rate is accordingly smaller, however, since the concave portions in which the cladding having a lower etching rate remains are high in the areal ratio of occupation. The areas inside the curves designated by the reference symbols C and D in FIG. 18 (the areas surrounded by the respective curves and the vertical and horizontal axes of the graph) correspond to the average amounts of process of the respective regions. The difference between the two areas is considered to decrease with time, thereby suppressing differences in surface roughness and in level between the regions.

Incidentally, the curves of FIGS. 17 and 18 show examples of estimated changes in the average etching rates in typical regions of concavo-convex pattern. In fact, there can be various regions which have convex portions of both different widths and different areal ratios of occupation. Nevertheless, the average etching rate of each individual region traces a time variation such that the foregoing examples are combined. Differences in the average amount of process among the regions are thus considered to decrease with time.

Accordingly, various exemplary embodiments of the present invention provide a method for filling concave portions of a concavo-convex pattern, comprising:

a filler deposition step of depositing a filler for filling concave portions over a surface of a object to be processed, the object being provided with a predetermined concavo-convex pattern;

a cladding deposition step of depositing a cladding over the filler; and a flattening step of removing an excess part of the filler and the cladding above the surface of the object to be processed for flattening, by using a dry etching method having a lower etching rate to the cladding than to the filler.

Alternatively, various exemplary embodiments of the present invention provide a method for filling concave portions of a concavo-convex pattern, comprising:

a filler deposition step of depositing a filler for filling concave portions over a surface of an object to be processed, the object being provided with a predetermined concavo-convex pattern;

a cladding deposition step of depositing a cladding over the filler;

a first flattening step of exposing the filler partially while flattening the surface of the object to be processed by using a dry etching method; and a second flattening step of removing an excess part of the filler and the cladding above the surface of the object to be processed for flattening, by using a dry etching method having a lower etching rate to the cladding than to the filler.

Moreover, various exemplary embodiments of the present invention provide a method for manufacturing a magnetic recording medium, comprising:

a filler deposition step of depositing a filler for filling concave portions over a surface of an object to be processed, the object being provided with a magnetic recording layer having a predetermined concavo-convex pattern;

a cladding deposition step of depositing a cladding over the filler; and a flattening step of removing an excess part of the filler and the cladding above the magnetic recording layer for flattening, by using a dry etching method having a lower etching rate to the cladding than to the filler.

Alternatively, various exemplary embodiments of the present invention provide a method for manufacturing a magnetic recording medium, comprising:

a filler deposition step of depositing a filler for filling concave portions over a surface of an object to be processed, the object being provided with a magnetic recording layer having a predetermined concavo-convex pattern;

a cladding deposition step of depositing a cladding over the filler;

a first flattening step of exposing the filler partially while flattening the surface of the object to be processed by using a dry etching method; and a second flattening step of removing an excess part of the filler and the cladding above the magnetic recording layer for flattening, by using a dry etching method having a lower etching rate to the cladding than to the filler.

Incidentally, as employed in the present application, the "magnetic recording layer of concavo-convex pattern" shall refer not only to a magnetic recording layer that is divided into a number of recording elements, but also to a recording layer of which recording elements are divided partially and continue to each other partly, a recording layer continuously formed over part of the substrate such as one in a helical (spiral) shape, and a continuous recording layer having both concave and convex portions.

As employed in the present application, the term "magnetic recording medium" shall not be limited to a hard disc, a floppy (registered trademark) disc, a magnetic tape, and the like which record and read information by means of magnetism alone, but also refer to a magneto-optic recording medium using both magnetism and light, such as an MO (Magneto Optical), and a recording medium of thermal assisted type using both magnetism and heat.

According to the present invention, it is possible to fill concave portions of a concavo-convex pattern efficiently, thereby flattening the surface with reliability while suppressing differences in surface roughness and in level between regions. Consequently, for example, a magnetic recording medium having a magnetic recording layer of concavo-convex pattern with a sufficiently flat surface can be manufactured efficiently and with reliability.

BRIEF DESCRIPTION OF THE DRAWINGS

Various exemplary embodiments of the present invention will be described in detail with reference to the accompanying drawings, wherein.

DETAILED DESCRIPTION OF THE PREFERRED EMBODIMENT

Various exemplary embodiments of this invention will be hereinafter described in detail with reference to the drawings.

Figure 1:
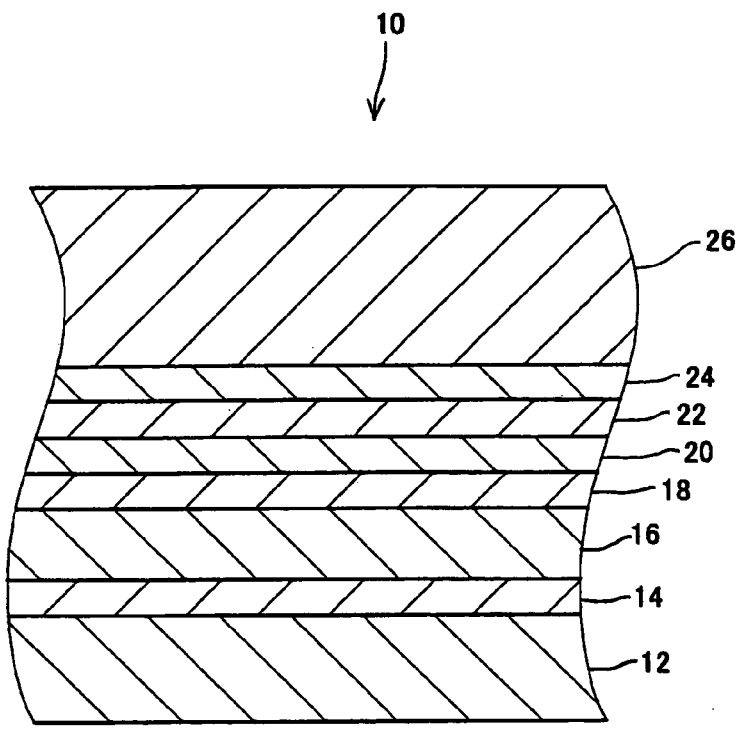
FIG. 1 is a schematic cross-sectional side view showing the structure of a starting body of an object to be processed according to a first exemplary embodiment of the present invention.
Figure 2:
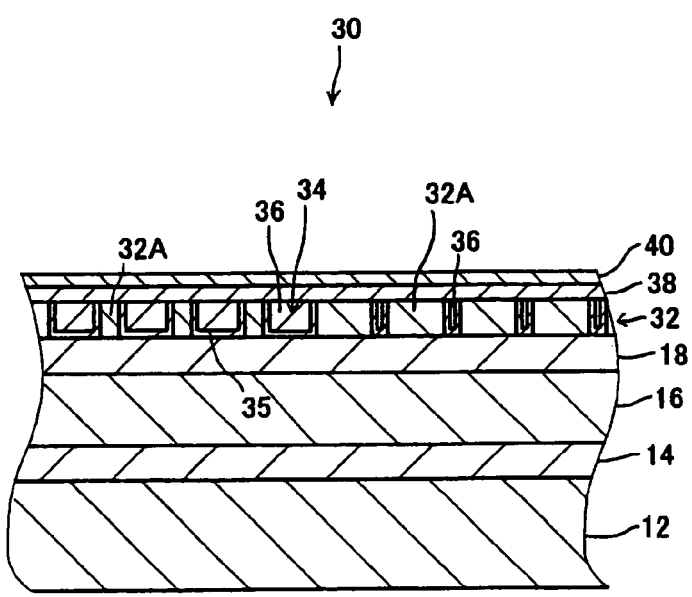
FIG. 2 is a schematic cross-sectional side view showing the structure of a magnetic recording medium obtained by processing the object to be processed.

A first exemplary embodiment of the present invention relates to a method for manufacturing a magnetic recording medium 30 shown in FIG. 2. In this method, a starting body of an object to be processed 10 such as shown in FIG. 1, obtained by forming a continuous recording layer 20 and the like over a glass substrate 12, is processed so that the continuous recording layer 20 is divided into a number of recording elements 32A to form a magnetic recording layer 32 having a predetermined concavo-convex pattern. Here, a nonmagnetic filler 36 is filled into concave portions 34 between the recording elements 32A (the concave portions of the concavo-convex pattern). The method is characterized by the step of filling the filler 36 and removing an excess part of the filler 36 to flatten the surface. Since the other steps are considered not important in understanding the present exemplary embodiment, description thereof will be omitted when appropriate.

As shown in FIG. 1, the starting body of the object to be processed 10 has the configuration that an underlayer 14, a soft magnetic layer 16, a seed layer 18, the continuous recording layer 20, a first mask layer 22, a second mask layer 24, and a resist layer 26 are formed over the glass substrate 12 in this order.

The underlayer 14 is made of Cr (chromium) or a Cr alloy, and has a thickness of 30 to 200 nm. The soft magnetic layer 16 is made of an Fe (iron) alloy or a Co (cobalt) alloy, and has a thickness of 50 to 300 nm. The seed layer 18 is made of CoO, MgO, NiO, or the like, and has a thickness of 3 to 30 nm.

The continuous recording layer 20 is made of a CoCr (cobalt-chromium) alloy, and has a thickness of 5 to 30 nm.

The first mask layer 22 is made of TiN (titanium nitride), and has a thickness of 3 to 50 nm. The second mask layer 24 is made of Ni (nickel), and has a thickness of 3 to 30 nm. The resist layer 26 is made of a negative type resist (NBE22A from Sumitomo Chemical Co., Ltd.), and has a thickness of 30 to 300 nm.

The magnetic recording medium 30 is a perpendicular recording type magnetic disc of discrete track type. As shown in FIG. 2, the magnetic recording layer 32 which are formed to divide the continuous recording layer 20 into a number of recording elements 32A having the shapes of concentric circles at small intervals in the radial direction is provided with a concavo-convex pattern. A stop film 35 is deposited on the concave portions 34 between the recording elements 32A. The filler 36 is filled in on the stop film 35. In addition, a protective layer 38 and a lubricating layer 40 are formed in this order over the recording elements 32A and the filler 36. Incidentally, in servo areas of the magnetic recording medium 30, the magnetic recording layer 32 is formed in a predetermined servo pattern.

The stop film 35 is made of a hard carbon film called diamond-like carbon. As employed in this specification document, the term "diamond-like carbon" (hereinafter, referred to as "DLC") shall refer to a material which is mainly composed of carbon, has an amorphous structure, and has a hardness of approximately 200 to 8000 kgf/mm$^2$ measured by a Vickers hardness test.

The filler 36 is made of nonmagnetic $SiO_2$ (silicon dioxide).

The protective layer 38 is made of the same DLC material as that of the stop film 35. The lubricating layer 40 is made of PFPE (perfluoropolyether).

Figure 3:
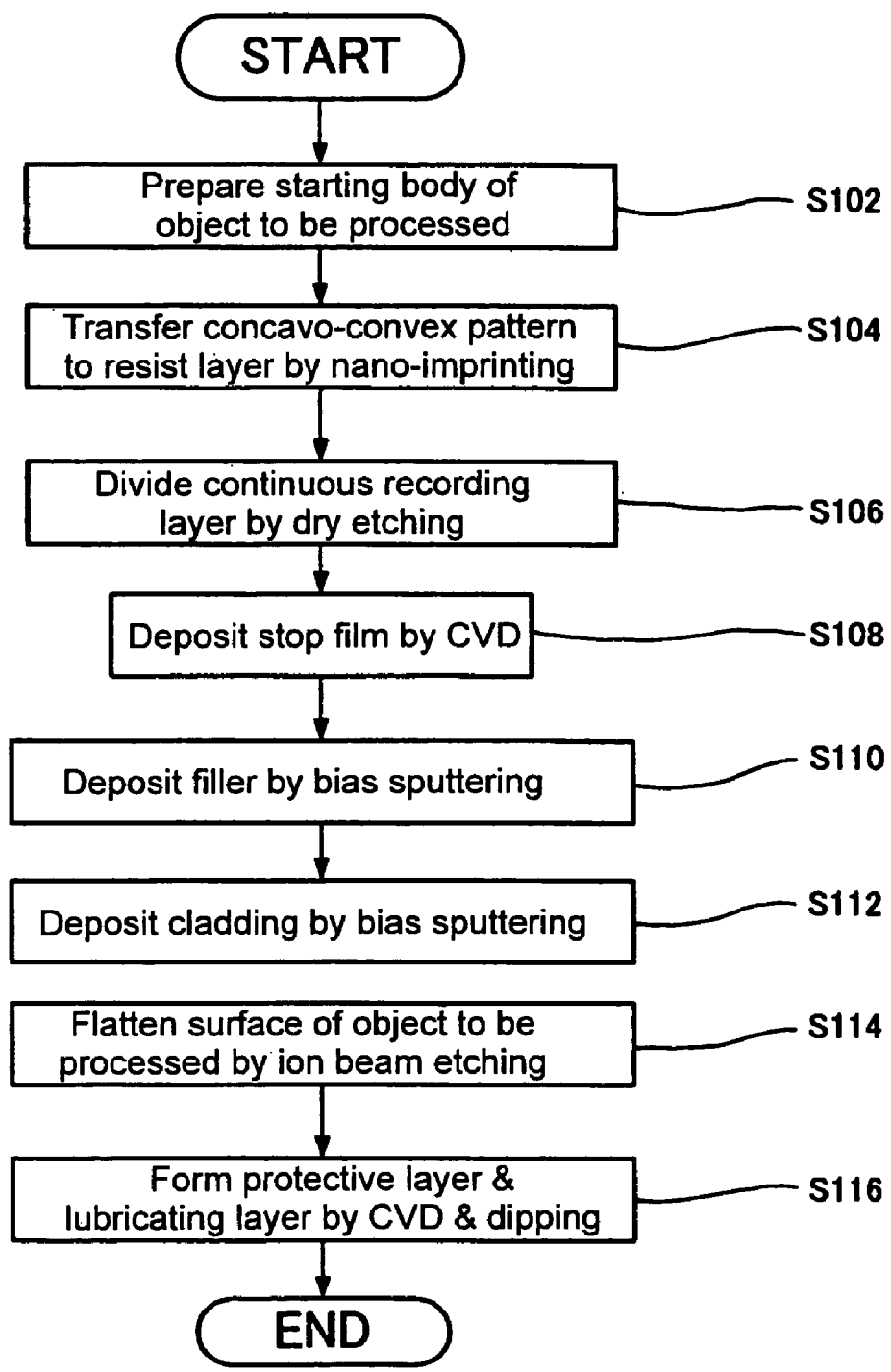
FIG. 3 is a flowchart showing an overview of the steps of manufacturing the magnetic recording medium.

Next, the method for processing the object to be processed 10 will be described along the flowchart shown in FIG. 3.

Initially, the starting body of the object to be processed 10 shown in FIG. 1 is prepared (S102). The starting body of the object to be processed 10 is obtained by forming the underlayer 14, the soft magnetic layer 16, the seed layer 18, the continuous recording layer 20, the first mask layer 22, and the second mask layer 24 over the glass substrate 12 in this order by sputtering, and further applying the resist layer 26 by dipping. Incidentally, the resist layer 26 may be applied by spin coating.

Figure 4:
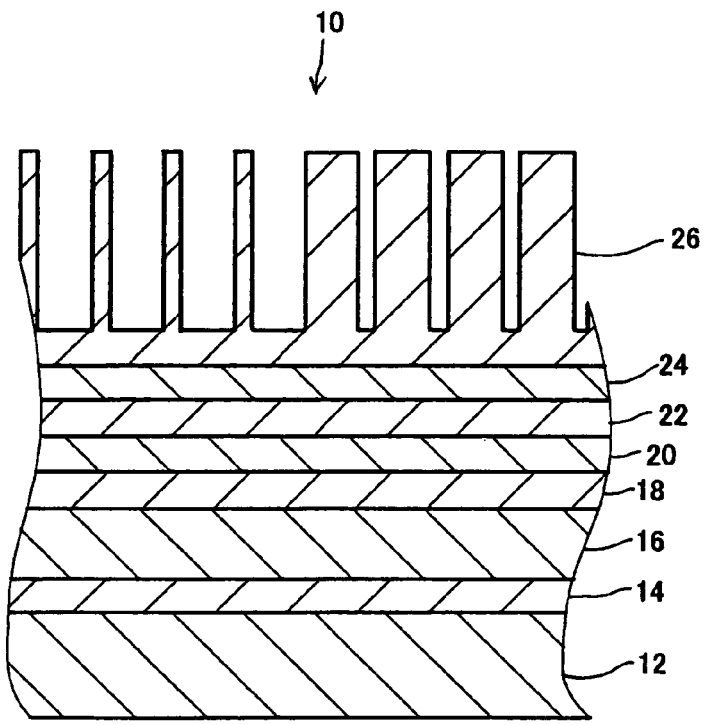
FIG. 4 is a schematic cross-sectional side view showing the configuration of the object to be processed in which a concavo-convex pattern is transferred to the resist layer.

By using a transfer system (not shown), a concavo-convex pattern corresponding to a predetermined servo pattern including contact holes and track pattern, such as shown in FIG. 4, is transferred to the resist layer 26 of the starting body of this object to be processed 10 by nanoimprinting (S104). Incidentally, the concavo-convex pattern may be formed by exposing and developing the resist layer 26.

Figure 5:
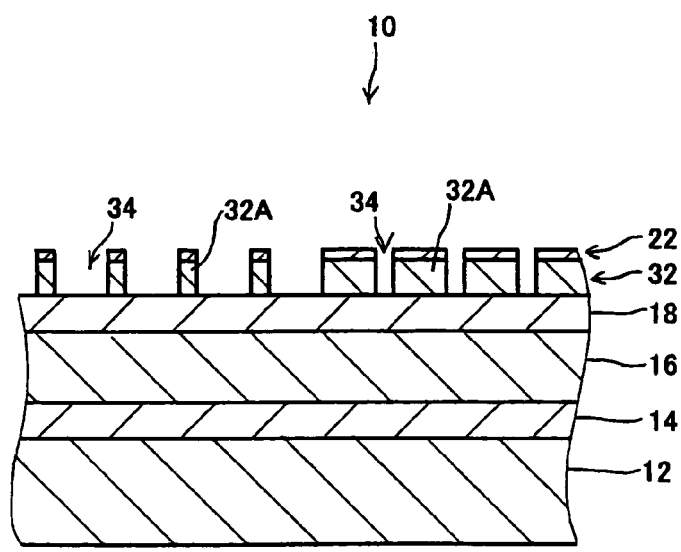
FIG. 5 is a schematic cross-sectional side view showing the configuration of the object to be processed in which the continuous recording layer is divided.

Next, the resist layer 26 at the concave-portion bottoms is removed by ashing. Then, the second mask layer 24 at the concave-portion bottoms is removed by ion beam etching using Ar (argon) gas. The first mask layer 22 at the concave-portion bottoms is further removed by reactive ion etching using $SF_6$ (sulfur hexafluoride) gas. The continuous recording layer 20 at the concave-portion bottoms is removed by reactive ion etching using CO gas and $NH_3$ gas as the reactive gases (S106). Consequently, the continuous recording layer 20 is divided into a number of recording elements 32A as shown in FIG. 5, whereby the magnetic recording layer 32 having a concavo-convex pattern is formed. The first mask layer 22 may sometimes remain on the tops of the recording elements 32A. Then, the first mask layer 22 remaining on the recording elements 32A is removed completely by reactive ion etching using $SF_6$ gas as the reactive gas. A reducing gas such as $NH_3$ gas is supplied to remove the $SF_6$ gas and others from the surface of the object to be processed 10.

Figure 6:
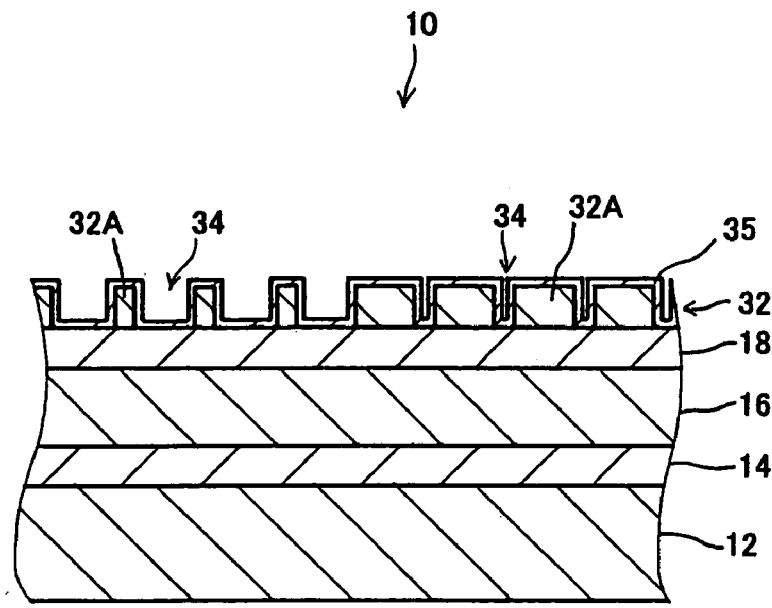
FIG. 6 is a schematic cross-sectional side view showing the configuration of the object to be processed in which a stop film is formed on the magnetic recording layer.

Next, as shown in FIG. 6, the DLC stop film 35 is deposited to a thickness of 1 to 20 nm on the tops and sides of the recording elements 32A by CVD (S108). Note that the stop film 35 is also deposited on the bottoms of the concave portions 34 between the recording elements 32A.

Next, the filler 36 is deposited over the surface of the object to be processed 10 by bias sputtering (S110). $SiO_2$ particles tend to deposit over the surface of the object to be processed 10 uniformly, thereby forming a concavo-convex shape at the surface. A bias voltage is thus applied to the object to be processed 10 so that the sputtering gas is biased toward the object to be processed 10 to impinge the $SiO_2$ deposition, whereby the $SiO_2$ deposition is etched in part. Since this etching action tends to remove protruding portions of the $SiO_2$ deposition selectively faster than the other portions, the concavities and convexities at the surface are flattened to some degree. When the depositing action surpasses the etching action, deposition proceeds while suppressing the concavities and convexities at the surface.

Figure 7:
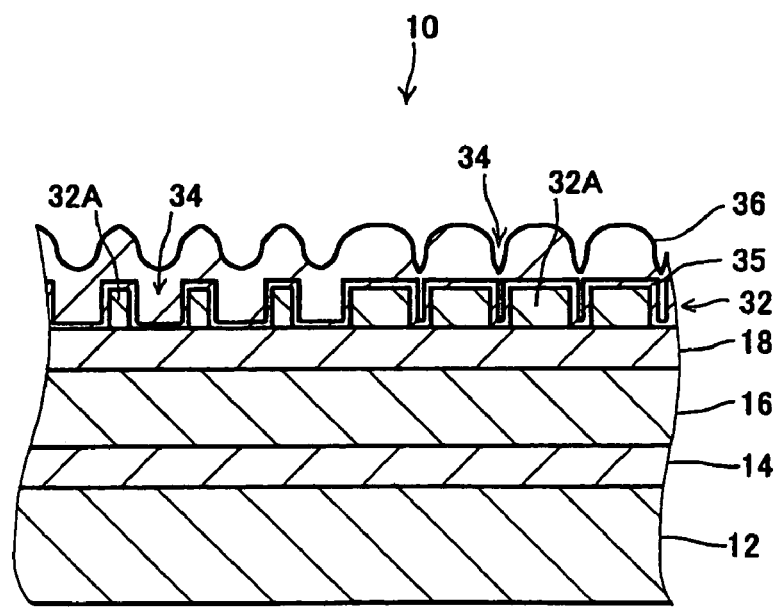
FIG. 7 is a schematic cross-sectional side view showing the configuration of the object to be processed in which a filler is deposited on the stop film.

Consequently, as shown in FIG. 7, the filler 36 is deposited to cover the recording elements 32A in such a shape that the concavities and convexities at the surface are suppressed to some degree. The concave portions 34 are filled with the filler 36. Incidentally, FIG. 7 shows the concavo-convex shape more exaggerated than in reality, for purpose of understanding of the present exemplary embodiment.

Figure 8:
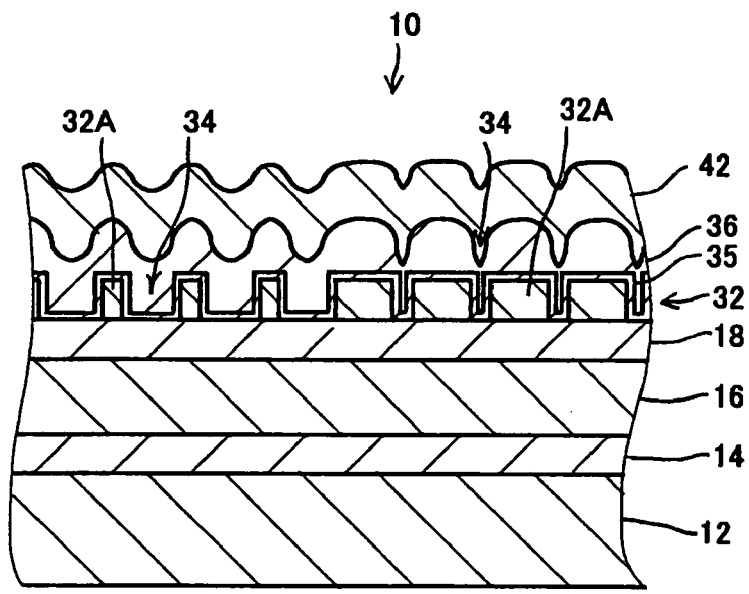
FIG. 8 is a schematic cross-sectional side view showing the configuration of the object to be processed in which a cladding is deposited over the filler.

Next, as shown in FIG. 8, a cladding 42 is deposited over the filler 36 by bias sputtering (S112). The cladding 42 is made of C (carbon), and has a lower etching rate with respect to ion beam etching than that of the filler 36 with respect to the ion beam etching. C particles are deposited over the filler 36 while suppressing the concavities and convexities at the surface.

Next, Ar gas is applied to the surface of the object to be processed 10 for ion beam etching. This removes an excess part of the cladding 42 and the filler 36 above the magnetic recording layer 32, thereby flattening the surface of the object to be processed 10 (S114). Here, the "excess part of the cladding 42 and the filler 36" shall refer to the portions of the cladding 42 and the filler 36 lying on upper side (the side opposite from the glass substrate 12) of the top surface of the magnetic recording layer 32 above the recording elements 32A. For high precision flattening, the incident angle of the Ar gas with respect to the surface preferably falls within the range of −10° to 15°. On the other hand, if a surface of preferable flatness is obtained by the deposition, the incident angle of the Ar gas preferably falls within the range of 15° to 90°. This can accelerate the process speed for higher production efficiency.

As employed herein, "the incident angle" shall refer to the incident angle with respect to the surface of the object to be processed, or the angle formed between the surface of the object to be processed and the center axis of the ion beam. For example, when the center axis of the ion beam and the surface of the object to be processed are parallel, the incident angle is 0°.

In this process, the cladding 42 alone is removed first. Since the ion beam etching tends to remove convex portions selectively faster than concave portions, the concavities and convexities of the cladding 42 at the surface are somewhat flattened while decreasing in thickness.

Among the convex portions, ones having relatively greater widths tend to have lower etching rates, and ones having relatively smaller widths tend to have higher etching rates. Then, if a region contains many convex portions that have greater widths and lower etching rates, the entire region including the concave portions around the convex portions tends to show a lower etching rate on the average. If a region contains many convex portions that have smaller widths and higher etching rates, the entire region including the concave portions around the convex portions tends to show a higher etching rate on the average.

Figure 9:
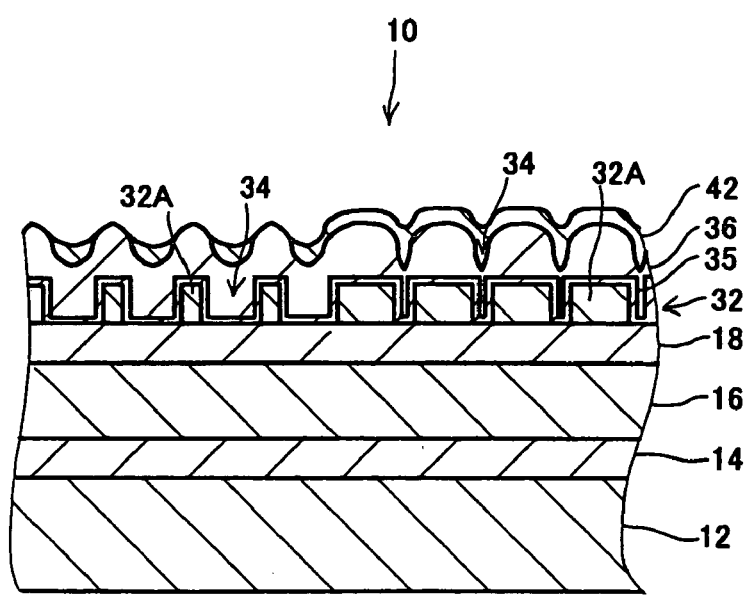
FIG. 9 is a schematic cross-sectional side view showing the configuration of the object to be processed in which the filler is partially exposed by flattening.
Figure 10:
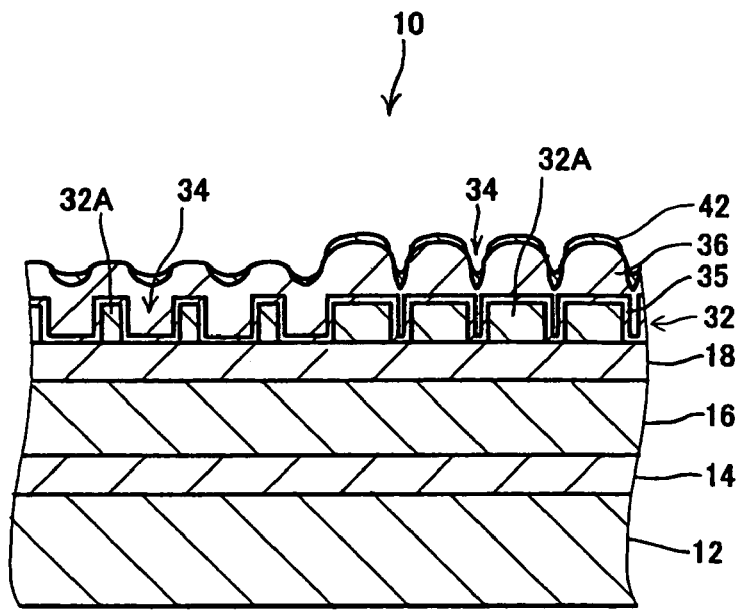
FIG. 10 is a schematic cross-sectional side view showing the configuration of the object to be processed some regions of which are flattened by flattening.
Figure 17:
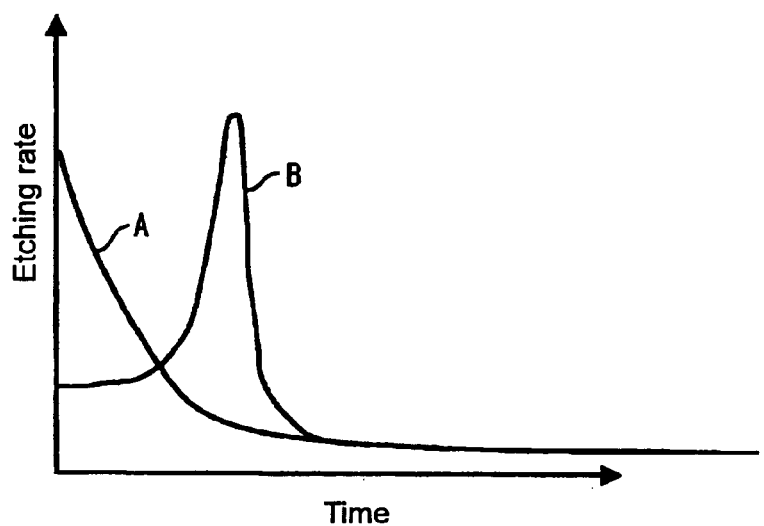
FIG. 17 is a graph showing an example of temporal changes in the etching rates of the filler and the cladding in the flattening step according to the filling method of the present invention.

Consequently, while the individual regions differ in surface roughness and in level immediately after the start of the flattening, the differences in surface roughness and in level between the regions decrease in the present exemplary embodiment. A possible reason for this is as follows:

As shown by the curve designated by the reference symbol A in FIG. 17, the region containing many convex portions that have smaller widths and higher etching rates is high in the average etching rate of the entire region immediately after the start of the flattening. The cladding 42 constituting the convex portions is thus removed at relatively high speed, whereby the filler 36 having a higher etching rate than that of the cladding 42 is exposed at the convex portions in the early stages after the start of the flattening as shown in FIG. 9. Consequently, the convex portions are removed down to the level of the concave portions quickly. As shown in FIG. 10, the concavities and convexities disappear or become significantly smaller, so that the average etching rate of the entire region decreases in the relatively early stages after the start of the flattening.

Figure 18:
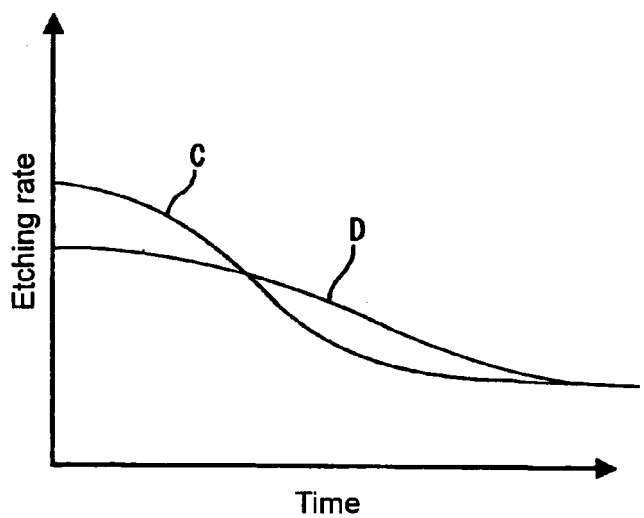
FIG. 18 is a graph showing another example of temporal changes in the etching rates of the filler and the cladding in the flattening step according to the filling method of the present invention.

Meanwhile, the relatively lower the areal ratio of occupation of the convex portions to the entire region is, the relatively lower the average etching rate of the entire region is immediately after the start of the flattening as shown by the curve designated by the reference symbol D in FIG. 18. The convex portions disappear or become significantly smaller with a delay after the start of the flattening, and the average etching rate of the entire region decreases further. Nevertheless, due to the high areal ratio of occupation of the concave portions in which the cladding 42 having an etching rate lower than that of the filler 36 remains, the degree of decrease of the etching rate is accordingly smaller.

Figure 11:
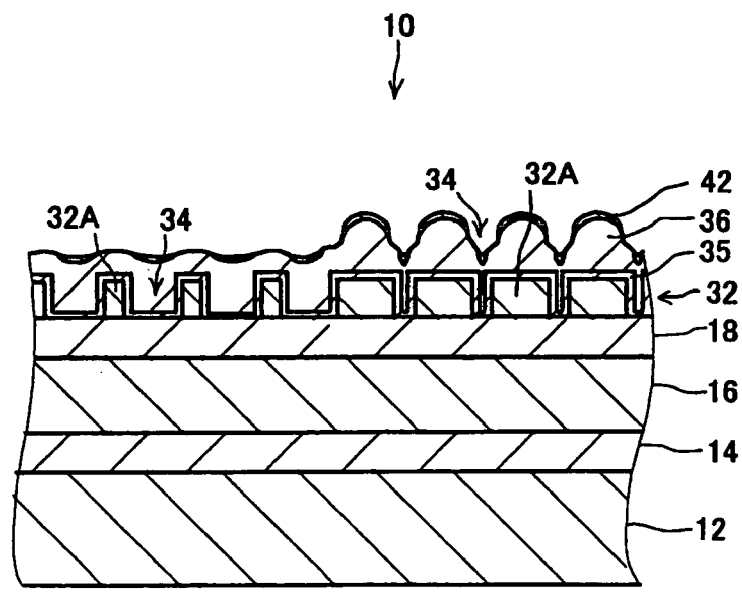
FIG. 11 is a schematic cross-sectional side view showing the configuration of the object to be processed flattened further.

In contrast, the region containing many convex portions that have greater widths and lower etching rates is low in the average etching rate of the entire region immediately after the start of the flattening as shown by the curve designated by the reference symbol B in FIG. 17. Since the convex portions remain relatively longer, the average etching rate of the entire region is less likely to change. When the filler 36 is exposed near the ends of the convex portions as shown in FIG. 10, however, the exposed filler 36 having a higher etching rate is etched so that the filler 36 and the cladding 42 over the filler 36 are both removed. As shown in FIG. 11, the convex portions are gradually narrowed to decrease in width. That is, the convex portions remain and gradually increase in etching rate. The average etching rate of the entire region thus increases with some delay after the start of the flattening.

The higher the areal ratio of occupation of the convex portions to the entire region is, the relatively higher the average etching rate of the entire region is immediately after the start of the flattening as shown by the curve designated by the reference symbol C in FIG. 18. The convex portions disappear or become significantly smaller in the relatively early stages. Since the convex portions having a higher etching rate disappear or become significantly smaller, the average etching rate of the entire region decreases in the relatively early stages after the start of the flattening. In addition, due to the low areal ratio of occupation of the concave portions in which the cladding 42 having an etching rate lower than that of the filler 36 remains, the degree of decrease of the etching rate is accordingly high.

Figure 12:
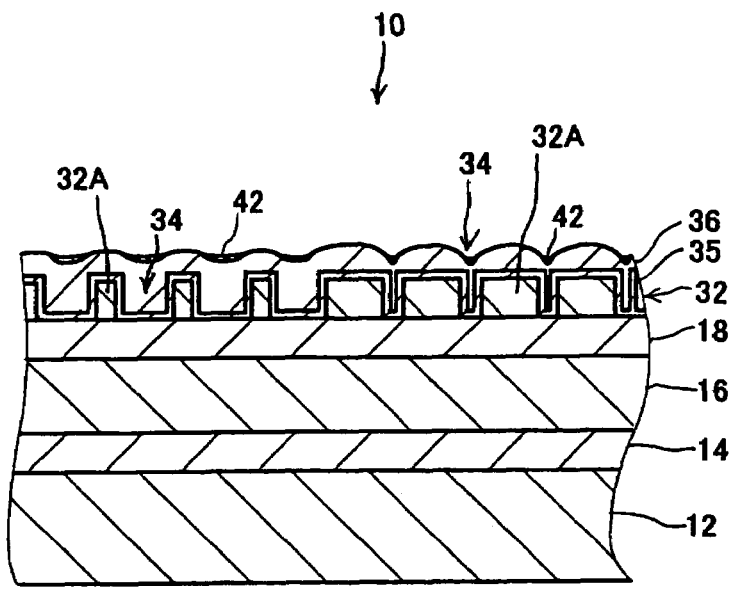
FIG. 12 is a schematic cross-sectional side view showing the configuration of the object to be processed flattened all over.

The etching proceeds further, and most of the cladding 42 constituting the convex portions is removed even in the region containing many convex portions that have greater widths and lower etching rates. This narrows the convex portions in width, and the convex portions are removed to the level of the concave portions quickly. As shown in FIG. 12, the concavities and convexities disappear or become significantly smaller to lower the etching rate of the entire region further.

Figure 13:
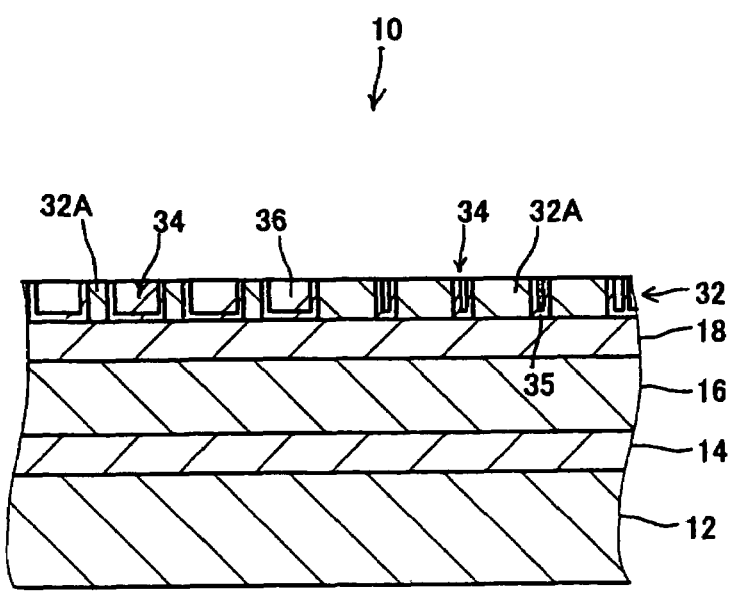
FIG. 13 is a schematic cross-sectional side view showing the configuration of the object to be processed after the completion of the flattening step.

The area inside a curve that is obtained by synthesizing the curve designated by the reference symbol A in FIG. 17 and the curve designated by the reference symbol D in FIG. 18 corresponds to the average amount of process of the left regions shown in FIGS. 7 to 12. The area inside a curve that is obtained by synthesizing the curve designated by the reference symbol B in FIG. 17 and the curve designated by the reference symbol C in FIG. 18 corresponds to the average amount of process of the right regions shown in FIGS. 7 to 12. The difference between the two areas is considered to decrease with time. In fact, there can be various regions in which convex portions have different widths and different areal ratios of occupation. Nevertheless, the average etching ratio of each individual region traces time variations such that the foregoing curves are synthesized. The differences in the average amount of process among the regions thus decrease with time. Consequently, in any of the regions, the concavities and convexities at the surface disappear or become significantly smaller while the differences in surface roughness and in level among the regions decrease. The differences in etching rate among the regions also decrease. The surface of generally flat shape is thus maintained subsequently while the cladding 42 and the filler 36 are removed for a reduction in thickness. The ion beam etching is stopped when the cladding 42 and the filler 36 are removed down to the tops of the recording elements 32A as shown in FIG. 13. Incidentally, the stop film 35 on the recording elements 32A may be left or removed.

Here, since the filler 36 has an etching rate higher than that of the cladding 42 with respect to ion beam etching, the portions of the filler 36 exposed among the cladding 42 can form concave portions. The concave portions will not be deepened excessively, however, because concave portions show lower etching rates than convex portions.

Suppose here that portions of the filler 36 exposed above the recording elements 32A form concave portions. Even if the concave portions are deepened, the recording elements 32A immediately below are covered with the stop film 35 which has an etching rate lower than that of the filler 36 with respect to ion beam etching, and the recording elements 32A can thus be protected. In addition, when the stop film 35 is exposed, the concave portions above the recording elements 32A decrease significantly in etching rate, whereby the flat surface can be obtained eventually.

Next, the DLC protective layer 38 is formed to a thickness of 1 to 5 nm over the top surfaces of the recording elements 32A and the filler 36 by CVD. In addition, the lubricating layer 40 of PFPE is applied to a thickness of 1 to 2 nm on the protective layer 38 by dipping (S116). As a result, the magnetic recording medium 30 shown in FIG. 2 is completed. Here, the surfaces of the recording elements 32A and the filler 36 are surely flattened before the formation of the protective layer 38 and the lubricating layer 40. This provides the magnetic recording medium 30 with a sufficiently flat surface, which ensures preferable head flying characteristics.

Since the stop film 35, which is made of DLC and has an etching rate lower than that of the filler 36 with respect to the ion beam etching, is formed on the recording elements 32A, the recording elements 32A are prevented from being etched in the flattening step (S114) and from deterioration in magnetic characteristics. That is, the magnetic recording medium 30 has preferable recording and reproduction precisions.

The formation of the stop film 35 on the recording elements 32A also makes it possible to reliably remove the filler 36 above the recording elements 32A without etching the recording elements 32A in the flattening step (S114). This also improves the recording and reproduction precisions of the magnetic recording medium 30.

Incidentally, in the flattening step (S114), the stop film 35 on the recording elements 32A can also be removed to improve the recording and reproduction precisions further. Leaving the stop film 35, on the other hand, allows sure protection of the recording elements 32A from ion beam etching. Since the stop film 35 has a relatively low etching rate with respect to the ion beam etching, the film can be reduced in thickness accordingly. The stop film 35, even if remaining on the recording elements 32A, has little effect on the recording and reproduction precisions.

In this first exemplary embodiment, the filler 36 is made of $SiO_2$ and the cladding 42 is made of C. The flattening step (S114) employs the ion beam etching using Ar gas as the process gas, in which the etching rate to the cladding 42 is lower than that to the filler 36. Nevertheless, the filler 36 and the cladding 42 may be made of a different combination of materials as long as the cladding 42 shows an etching rate lower than that of the filler 36. Examples of the available materials include other nonmagnetic materials such as other oxides, nitrides such as TiN (titanium oxide), and Ta (tantalum), TaSi, and Si. Moreover, the cladding 42 may be made of magnetic materials, or fluid materials such as a photoresist material. Incidentally, crystal materials can be easily etched in units of crystal grain boundaries by dry etching, and are susceptible to surface concavities and convexities in units of crystal grain boundaries. For the sake of improved flatness, the filler 36 and the cladding 42 are thus preferably made of amorphous materials.

Moreover, the flattening step (S114) may employ ion beam etching using other noble gases such as Kr (krypton) and Xe (xenon). It is also possible to employ other dry etching methods including reactive ion beam etching and reactive ion etching using halogen-containing reactive gases such as $SF_6$, $CF_4$ (carbon tetrachloride), and $C_2F_6$ (hexafluoroethane). Table 1 shows examples of preferable combinations of the materials of the filler 36 and the cladding 42 and the dry etching method in the flattening step (S114).

TABLE 1

| Type of dry etching | | | |
|---|---|---|---|
| Process gas | Incident angle | Filler | Cladding |
| Ar, Xe, or other noble gases | No smaller than −10°, nor greater than 90° (All angles) | $SiO_2$ | C |
| | | | Ta |
| | | | TiN |
| | | | TaSi |
| | | Si | C |
| | | Al | C |

TABLE 1-continued

Type of dry etching

| Process gas | Incident angle | Filler | Cladding |
|---|---|---|---|
| | | Au | Al |
| | | | C |
| | | Resist AZ | C |
| | No smaller than 45°, nor greater than 90° | Al | SiO$_2$ |
| | | | Si |
| | No smaller than 40°, nor greater than 90° | Al | Resist AZ |
| | No smaller than 30°, nor greater than 90° | SiO$_2$ | Resist AZ |
| | | Si | Resist AZ |
| | | Au | Resist AZ |
| | | | Si |
| | | | SiO$_2$ |
| | No smaller than −10°, nor greater than 45° | SiO$_2$ | Al |
| | | Si | Al |
| | No smaller than −10°, nor greater than 40 | SiO$_2$ | Si |
| | | Resist AZ | Al |
| | No smaller than −10°, nor greater than 30° | SiO$_2$ | Au |
| | | Resist AZ | AU |
| | | | Si |
| | | | SiO$_2$ |
| Halogen-containing gases including F, Cl or the like | No smaller than −10°, nor greater than 90° (All angles) | SiO$_2$, Si, TaSi, TiN, Ta, ITO, MgO, Al$_2$O$_3$ | C, Al, Ni, Au |
| O$_2$ gas | No smaller than −10°, nor greater than 90° (All angles) | C | TiN, Ta, ITO, MgO, Al$_2$O$_3$, Al, Ni, Au |

Resist AZ: AZ type resist material from Clariant AG
ITO: tin-doped indium oxide

In this first exemplary embodiment, the stop film 35 is made of DLC. The present invention can employ other nonmagnetic materials as long as they exhibit low etching rates in the flattening step (S114).

Figure 14:
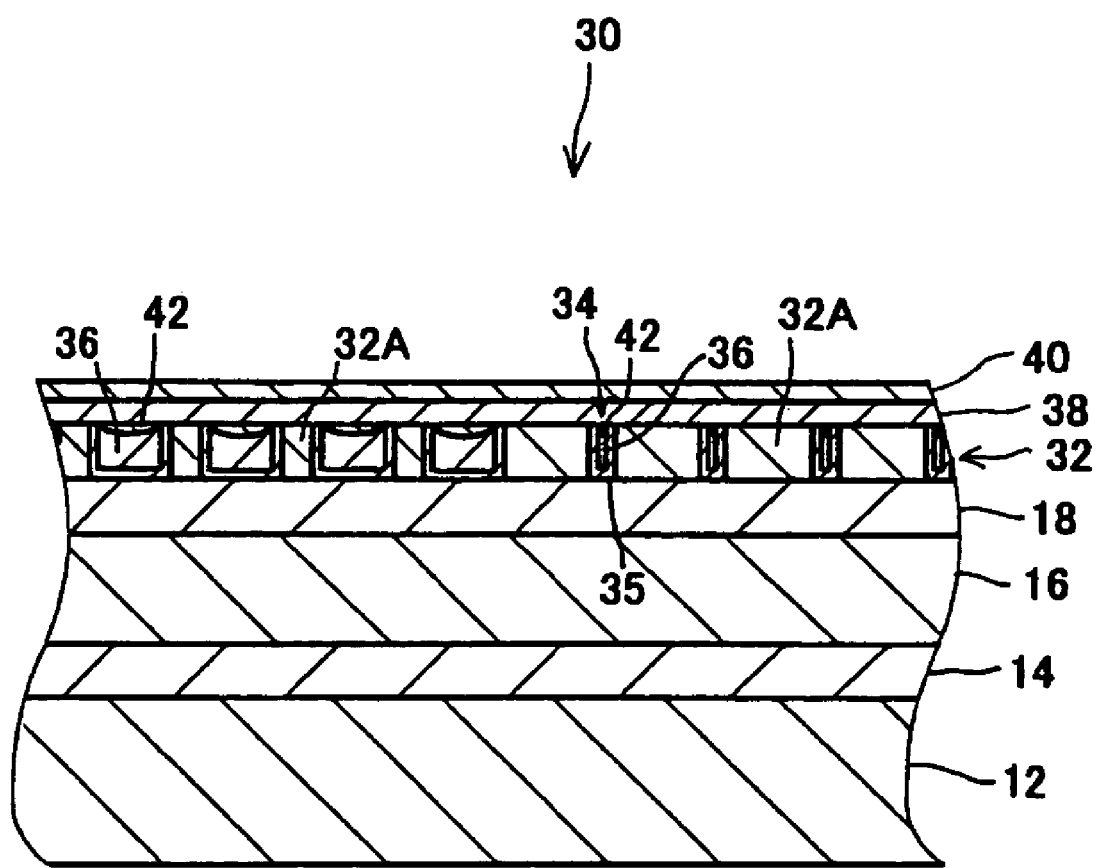
FIG. 14 is a schematic cross-sectional side view showing the configuration of a magnetic recording medium according to a second exemplary embodiment of the present invention.

In this first exemplary embodiment, the cladding 42 is completely removed in the flattening step (S114). Nevertheless, as in a second exemplary embodiment of the present invention which is shown in FIG. 14, the cladding 42 may be filled into the concave portions 34 along with the filler 36 at the time of deposition, so that the cladding 42 remains in the concave portions between the recording elements 32A. In this case, the cladding 42 is preferably made of a nonmagnetic material.

Figure 15:
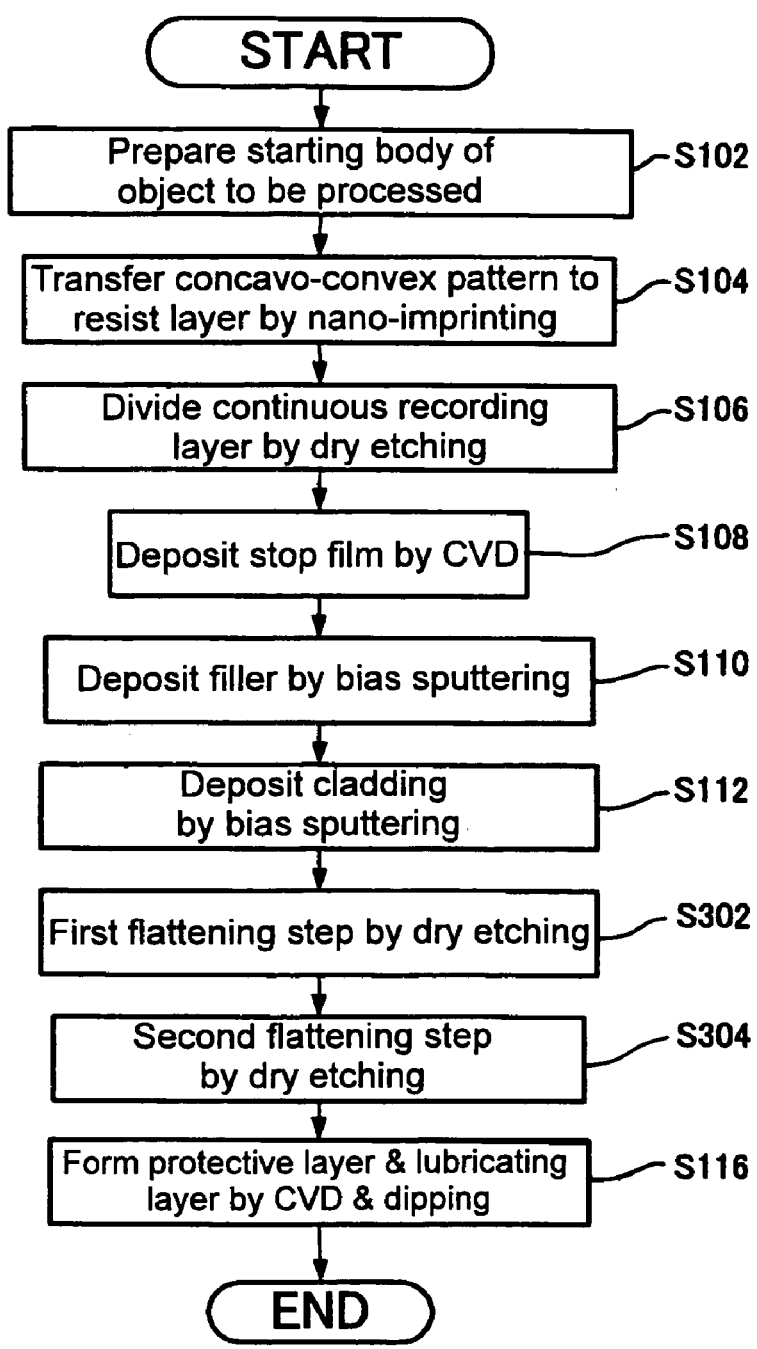
FIG. 15 is a flowchart showing an overview of the steps of manufacturing a magnetic recording medium according to a third exemplary embodiment of the present invention.
Figure 16:
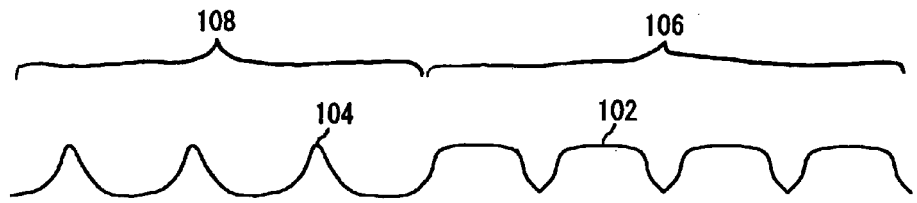
FIG. 16A is a schematic cross-sectional side view showing the initial configuration of a filler in the flattening step according to a conventional filling method.
FIG. 16B is a schematic cross-sectional side view showing the configuration of the filler in process in the flattening step.
FIG. 16C is a schematic cross-sectional side view showing the configuration of the filler further processed in the flattening step.
FIG. 16D is a schematic cross-sectional side view showing the final configuration of the filler in the flattening step.
Figure 16:
Figure 16:
Figure 16:
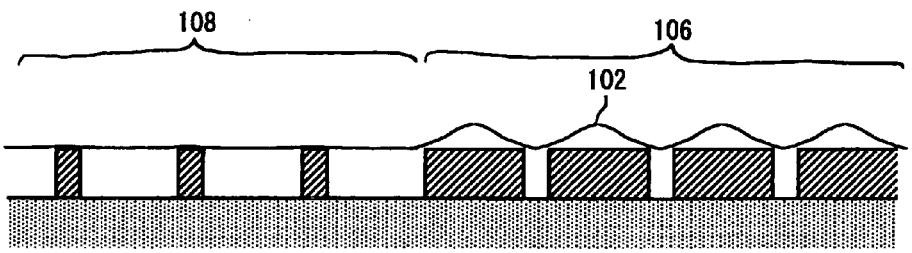

In the foregoing first exemplary embodiment, the excess part of the filler 36 and the cladding 42 above the recording elements 32A are removed in one step. Nevertheless, the excess part of the filler 36 and the cladding 42 may be removed in two steps as in a third exemplary embodiment of the present invention which is shown by a flowchart of FIG. 15. Specifically, in a first flattening step (S302), the filler 36 is exposed partially while the surface of the object to be processed 10 being flattened by using a method of dry etching. In a second flattening step (S304), the excess part of the filler 36 and the cladding 42 above the surface of the object to be processed 10 are removed by using another method for dry etching that has a lower etching rate to the cladding 42 than to the filler 36.

In this case, the first flattening step may use a method of dry etching that has a higher etching rate to the cladding 42 than to the filler 36, or a method of dry etching that has the same etching rate to the two materials.

Here, the first flattening step (S302) preferably uses a method of dry etching having a higher etching rate to the cladding 42 than that of the second flattening step (S304). This can improve the production efficiency of the flattening steps. For example, the first flattening step (S302) may perform dry etching through reactive ion etching using a reactive gas that chemically reacts with the cladding 42. This allows a significant improvement to the production efficiency of the flattening step.

In another example, the first flattening step (S302) and the second flattening step (S304) use a method of dry etching in which a process gas is applied to the surface of the object to be processed 10 for flattening. The incident angle of the process gas with respect to the surface of the object to be processed 10 can be adjusted to adjust the etching rates to the filler 36 and the cladding 42. Otherwise, the first flattening step (S302) and the second flattening step (S304) may use different types of process gases so as to adjust the etching rates to the filler 36 and the cladding 42. As above, when the incident angle of the process gas or the type of the process gas is changed to adjust the etching rates to the filler 36 and the cladding 42, it is possible to use same type of dry etching in the first and second flattening steps. A common dry etching system can thus be used to perform the first and second flattening steps, thereby suppressing the equipment cost. Incidentally, even if the first and second flattening steps are performed by using different dry etching systems, a certain effect of suppression on equipment cost can be obtained when the plurality of dry etching systems are given a common structure. Moreover, the use of the plurality of dry etching systems makes it possible to perform respective steps consecutively, thereby allowing an improvement to the production efficiency. When the first and second flattening steps use a plurality of dry etching systems with a common process gas, system-to-system transfer is facilitated. This also allows an improvement to the production efficiency.

Figure 19:
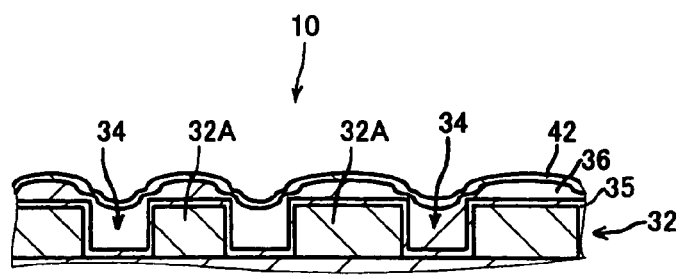
FIG. 19 is a schematic cross-sectional side view showing the configuration of an object to be processed according to another exemplary embodiment of the present invention.

In the foregoing first exemplary embodiment, the deposition of the filler 36 is immediately followed by the deposition of the cladding 42. Nevertheless, the filler 36 may be flattened to some extent by dry etching before the deposition of the cladding 42. In this way, the convex portions of the filler 36 in all the regions of the concavo-convex pattern can be reduced to some extent in width as shown in FIG. 19. When the widths of the convex portions are reduced in advance before the flattening step(s) is/are performed as in the first or third exemplary embodiment, it is possible to provide the effect of reducing differences in level between the surfaces of the regions and differences in the concavo-convex configuration further. Moreover, even when the convex portions of the deposited filler 36 include ones having significantly greater widths, the widths can be reduced in advance before the flattening step(s) is/are performed as in the first or third exemplary embodiment. As a result, the surfaces of all the regions can be flattened uniformly.

In this case, before the deposition of the cladding 42, the filler 36 may be dry etched so that differences in position in the direction of thickness between the top surfaces of the filler 36 in the concave portions and the top surfaces of the stop film on the convex portions fall within the range of −10 to +10 nm, preferably within the range of −5 to +5 nm, and yet preferably to 0 nm. This makes it possible to obtain a sufficient flattening effect from the flattening after the deposition of the cladding 42.

In the foregoing first exemplary embodiment, the filler 36 and the cladding 42 are deposited by bias sputtering, whereas the deposition method is not limited in particular. For example, the cladding 42 may be deposited by sputtering. The filler 36 and the cladding 42 may be deposited by other deposition methods such as CVD and IBD. When the cladding 42 is made of a fluid material such as a photoresist material, it may be deposited by spin coating or doctor blading.

Similarly, while the stop film 35 is formed by CVD in the foregoing first exemplary embodiment, it may be deposited by using other deposition methods unless the deposition methods cause serious damage to the recording elements 32A.

It is confirmed that the etching rate of the magnetic recording layer 32 falls below that of the filler 36 when the incident angle of the Ar gas in the flattening step (S114) or the second flattening step (S304) of the third exemplary embodiment is set to small angles of, e.g., around −10° to 5°. Since the magnetic recording layer 32 itself substantially plays the role of the stop film, it is possible to omit the stop film 35 and deposit the filler 36 on the recording elements 32A directly.

In the foregoing first exemplary embodiment, the first mask layer 22, the second mask layer 24, and the resist layer 26 are formed over the continuous recording layer 20, and the continuous recording layer 20 is divided through three stages of dry etching. Nevertheless, the materials of the resist layer and the mask layers, the number of laminations, the thicknesses, and the types of dry etching are not particularly limited as long as the continuous recording layer 20 can be divided with a high degree of precision.

In the foregoing first exemplary embodiment, the continuous recording layer 20 (the recording elements 32A) is made of a CoCr alloy. Nevertheless, the present invention is also applicable to the processing of a magnetic recording medium which has recording elements made of other materials such as other alloys containing iron-group elements (Co, Fe, and Ni) and laminates thereof.

In the foregoing first exemplary embodiment, the underlayer 14, the soft magnetic layer 16, and the seed layer 18 are formed under the continuous recording layer 20. The layers under the continuous recording layer 20 may be changed as appropriate according to the type of the magnetic recording medium. For example, one or two of the underlayer 14, the soft magnetic layer 16, and the seed layer 18 may be omitted. The continuous recording layer may be formed directly on the substrate.

In the foregoing first exemplary embodiment, the magnetic recording medium 30 is a perpendicular recording magnetic disc of discrete track type in which the magnetic recording layer 32 is divided at small intervals in the radial direction of the tracks. It is understood that the present invention is also applicable to the manufacturing of other magnetic discs such as: a magnetic disc in which the magnetic recording layer is divided at small intervals in the circumferential direction of the tracks (in the sector direction); a magnetic disc in which the tracks are divided at small intervals both in the radial direction and the circumferential direction; a magnetic disc of PERM (Pre-Embossed Recording Medium) type, having a continuous magnetic recording layer in which both concave portion and convex portion are formed; and a magnetic disc having a magnetic recording layer of spiral configuration. In addition, the present invention is also applicable to the manufacturing of magneto-optic discs, such as an MO, magnetic discs of thermally assisted type, and magnetic recording media having a recording layer of concave-convex pattern excluding ones having a disc-like configuration, such as a magnetic tape.

Moreover, the foregoing first exemplary embodiment relates to the method for manufacturing a magnetic recording medium. The present invention is applicable to various other fields in which concave portions of a concavo-convex pattern need to be filled. Examples of the applicable fields include other information recording media such as an optical recording medium, and semiconductors.

WORKING EXAMPLE 1

An object to be processed 10 was processed as in the foregoing first exemplary embodiment. Specifically, a concavo-convex pattern including the two patterns shown in Table 2 was formed as the concavo-convex pattern of the magnetic recording layer 32. Moreover, a DLC stop film 35 was deposited to a thickness of 4 nm.

TABLE 2

|  | Pattern 1 | Pattern 2 |
|---|---|---|
| Track pitch (nm) (Pitch of adjacent recording element) | 200 | 200 |
| Width of recording element (nm) | 100 | 150 |
| Width of concave poritons (nm) | 100 | 50 |
| Height of recording elements (nm) | 30 | 30 |

On this magnetic recording layer 32 (stop film 35), a filler 36 made of $SiO_2$ was deposited to a thickness of approximately 40 nm by bias sputtering. Here, Ar was used as the sputtering gas. The deposition power was set to approximately 500 W, the bias power approximately 150 W, and the pressure inside the vacuum chamber approximately 0.3 Pa.

In addition, a cladding 42 made of C was deposited to a thickness of approximately 20 nm over the filler 36 by bias sputtering, with the deposition power set to approximately 500 W, the bias power approximately 150 W, and the pressure inside the vacuum chamber approximately 0.3 Pa. Here, the surfaces of the filler 36 and the cladding 42 were shaped to have small suppressed concavities and convexities. Thus, a thickness meter having a generally flat surface with negligible concavities and convexities was placed near the object to be processed 10. Then, the thicknesses of the filler 36 and the cladding 42 deposited on the thickness meter, having flat surface, were measured as the thicknesses of the filler 36 and the cladding 42 of the object to be processed 10.

Next, ion beam etching using Ar gas as the process gas was performed to flatten the surface until the excess part of the filler 36 and the cladding 42 were removed in the region of the pattern 1 on the magnetic recording layer 32. The incident angle of the Ar gas was set at approximately 2° with respect to the surface of the object to be processed. The flattening step (S114) was performed for about 14 minutes 5 seconds until the excess part of the filler 36 and the cladding 42 were removed completely in the region of the pattern 1 on the magnetic recording layer 32.

After the flattening step (S114), the image of the surface was captured under an atomic force microscope, whereby the region of the pattern 1 and the region of the pattern 2 were measured for the arithmetical mean deviation of the assessed profile Ra at the surface. Table 3 shows the measurements and the time required for the flattening step.

WORKING EXAMPLE 2

As in the foregoing third exemplary embodiment, the excess part of the filler 36 and the cladding 42 above the magnetic recording layer 32 were removed in two steps, or the first flattening step (S302) and the second flattening step (S304). The rest of the conditions were the same as in the foregoing Working Example 1.

Specifically, in the first flattening step (S302), reactive ion beam etching was performed by using $C_2F_6$ (hexafluoroethane) as the reactive gas. The incident angle of the $C_2F_6$ gas was set at approximately 2° with respect to the surface of the object to be processed. The first flattening step (S302) was performed for about 3 minutes 2 seconds until the filler 36 is partially exposed from the cladding 42.

In the second flattening step (S304), ion beam etching was performed by using Ar gas as the process gas. The incident angle of the Ar gas was set at approximately 2° with respect to the surface of the object to be processed. The second flattening step (S304) was performed for about 4 minutes 7 seconds until the excess part of the filler 36 and the cladding 42 were removed completely in the region of the pattern 1 on the magnetic recording layer 36.

After the second flattening step, the image of the surface was captured under an atomic force microscope, whereby the region of the pattern 1 and the region of the pattern 2 were measured for the arithmetical mean deviation of the assessed profile Ra at the surface. Table 3 shows the measurements and the total time required for the first and second flattening steps.

WORKING EXAMPLE 3

This Working Example 3 was an experimental example of the foregoing first exemplary embodiment as well as the foregoing Working Example 1 was. Unlike the Working Example 1, however, the filler 36 was deposited to a thickness of approximately 35 nm. Besides, the cladding 42 was made of Ta (tantalum), instead of C, and deposited to a thickness of approximately 4 nm. The rest of the conditions were the same as in the foregoing Working Example 1.

As in the Working Example 1, ion beam etching was performed by using Ar gas as the process gas with the incident angle of the Ar gas set at approximately 2° with respect to the surface of the object to be processed. The ion beam etching was performed for about 9 minutes 32 seconds until the excess part of the filler 36 and the cladding 42 were removed in the region of the pattern 1 on the magnetic recording layer 36.

After the flattening step, the image of the surface was captured under an atomic force microscope, whereby the region of the pattern 1 and the region of the pattern 2 were measured for the arithmetical mean deviation of the assessed profile Ra at the surface. Table 3 shows the measurements and the time required for the flattening step.

WORKING EXAMPLE 4

This Working Example 4 is an experimental example of the foregoing third exemplary embodiment. Unlike the foregoing Example 3, the excess part of the filler 36 and the cladding 42 above the magnetic recording layer 32 were removed in two steps, or the first flattening step (S302) and the second flattening step (S304). The rest of the conditions were the same as in the Working Example 3.

Specifically, in the first flattening step (S302), ion beam etching was performed by using Ar gas as the process gas with the incident angle of the Ar gas set at approximately 10° with respect to the surface of the object to be processed. The ion beam etching was performed for about 1 minute 18 seconds until the filler 36 was partially exposed from the cladding 42.

In the second flattening step (S304), ion beam etching was performed by using Ar gas as the process gas with the incident angle of the Ar gas set at approximately 2° with respect to the surface of the object to be processed as in the Working Example 3. The ion beam etching was performed for about 3 minutes 41 seconds until the excess part of the filler 36 and the cladding 42 were removed in the region of the pattern 1 on the magnetic recording layer 36.

After the second flattening step, the image of the surface was captured under an atomic force microscope, whereby the region of the pattern 1 and the region of the pattern 2 were measured for the arithmetical mean deviation of the assessed profile Ra at the surface. Table 3 shows the measurements and the total time required for the first and second flattening steps.

For the sake of comparison, Table 4 shows the process and reactive gases used in the flattening steps of the Working Examples 1 to 4, the incident angles of these gases, the materials of the fillers 36 and the claddings 42, the etching rates, and the etching selection ratios.

TABLE 3

| | Arithmetical mean deviation of the assessed profile(nm) | | Time required for flattening step (s) |
|---|---|---|---|
| | Pattern 1 | Pattern 2 | |
| Working example 1 | 0.892 | 0.936 | 14 min 5 sec |
| Working example 2 | 0.923 | 0.953 | 7 min 9 sec |
| Working example 3 | 0.905 | 0.955 | 9 min 32 sec |
| Working example 4 | 0.942 | 0.969 | 4 min 59 sec |
| Comparative example | 0.963 | 1.528 | 8 min 27 sec |

TABLE 4

| | Gas | Incident angle (°) | Etching rate (Å/min) | | Selection ratio |
|---|---|---|---|---|---|
| | | | Filler | Cladding | |
| Working example 1 | Ar | 2 | 42($SiO_2$) | 19(C) | 2.2 |
| Working example 2 | $C_2F_6$ | 2 | 85($SiO_2$) | 67(C) | 1.3 |
| | Ar | 2 | 42($SiO_2$) | 19(C) | 2.2 |
| Working example 3 | Ar | 2 | 42($SiO_2$) | 4(Ta) | 10.5 |
| Working example 4 | Ar | 10 | 98($SiO_2$) | 35(Ta) | 2.8 |
| | Ar | 2 | 42($SiO_2$) | 4(Ta) | 10.5 |
| Comparative example | Ar | 2 | 42($SiO_2$) | — | — |

COMPARATIVE EXAMPLE

Unlike the foregoing Working Example 1, a filler 36 was deposited to a thickness of approximately 60 nm. No cladding 42 was deposited thereon. The rest of the conditions were the same as in the Working Example 1.

As in the Working Example 1, ion beam etching was performed by using Ar gas as the process gas with the incident angle of the Ar gas set at approximately 2° with respect to the surface of the object to be processed. The flattening was performed for 8 minutes 27 seconds until the excess part of the filler 36 were removed in the region of the pattern 1 on the magnetic recording layer 36.

After the flattening step, the image of the surface was captured under an atomic force microscope, whereby the region of the pattern 1 and the region of the pattern 2 were measured for the arithmetical mean deviation of the assessed profile Ra at the surface. Table 3 shows the measurements and the time required for the flattening step.

From Table 3, it is shown that the comparative example suppresses the arithmetical mean deviation of the assessed profile Ra less than 1 nm at the surface of the region of the pattern 1, whereas the arithmetical mean deviation of the assessed profile Ra at the surface of the region of the pattern 2 exceeds 1 nm. In contrast, it is confirmed that any of the Working Examples 1 to 4 suppresses the arithmetical mean deviation of the assessed profile Ra at the surfaces of both the regions of the patterns 1 and 2 less than 1 nm, which means more preferable flattening than in the comparative example.

Moreover, it is confirmed that the Working Example 2, having the two steps of flattening, reduces the time required for the flattening steps significantly as compared to the Working Example 1. Similarly, it is also confirmed that the Working Example 4, having the two steps of flattening, reduces the time required for the flattening steps as compared to the Working Example 3.

The present invention may be applied to manufacture magnetic recording media having a magnetic recording layer of concavo-convex pattern, such as a hard disc of discrete track type, as well as other information recording media, semiconductor products, and the like in which concave portions of a concavo-convex pattern need to be filled.

What is claimed is:

1. A method for filling concave portions of a concavo-convex pattern, comprising:
    a filler deposition step of depositing a filler for filling concave portions over a surface of an object to be processed, the object being provided with a predetermined concavo-convex pattern;
    a cladding deposition step of depositing a cladding over the filler; and
    a flattening step of removing an excess part of the filler and the cladding above the surface of the object to be processed for flattening, by using a dry etching method having a lower etching rate to the cladding than to the filler, wherein
    at least in some of the convex portions of the filler, the filler is exposed from the cladding at side portions of the convex portions faster than upper surface portions of the convex portions in the flattening step.

2. The method for filling concave portions of a concavo-convex pattern according to claim 1, wherein
    the filler deposition step is preceded by a stop film deposition step of depositing a stop film over the surface of the object to be processed, the stop film having an etching rate lower than that of the filler with respect to the dry etching method in the flattening step.

3. A method for filling concave portions of a concavo-convex pattern, comprising:
    a filler deposition step of depositing a filler for filling concave portions over a surface of an object to be processed, the object being provided with a predetermined concavo-convex pattern;
    a cladding deposition step of depositing a cladding over the filler; and
    a flattening step that includes:
        a first flattening step of exposing the filler partially while flattening the surface of the object to be processed by using a dry etching method; and
        a second flattening step of removing an excess part of the filler and the cladding above the surface of the object to be processed for flattening, by using a dry etching method having a lower etching rate to the cladding than to the filler, wherein
    at least in some of the convex portions of the filler, the filler is exposed from the cladding at side portions of the convex portions faster than upper surface portions of the convex portions in the flattening step.

4. The method for filling concave portions of a concavo-convex pattern according to claim 3, wherein
    the dry etching method used in the first flattening step has a higher etching rate to the cladding than that used in the second flattening step.

5. The method for filling concave portions of a concavo-convex pattern according to claim 3, wherein:
    a dry etching method applying a process gas to the surface of the object to be processed is used in the first flattening step and the second flattening step for flattening; and
    the incident angle of the process gas with respect to the surface of the object to be processed is adjusted to adjust the etching rates to the filler and the cladding.

6. The method for filling concave portions of a concavo-convex pattern according to claim 3, wherein
    the etching rates to the filler and the cladding are adjusted by using different types of process gases in the first flattening step and the second flattening step.

7. The method for filling concave portions of a concavo-convex pattern according to claim 3, wherein
    the filler deposition step is preceded by a stop film deposition step of depositing a stop film over the surface of the object to be processed, the stop film having an etching rate lower than that of the filler with respect to the dry etching method in the second flattening step.

8. The method for filling concave portions of a concavo-convex pattern according to claim 3, wherein
    reactive ion etching is used in the first flattening step.

9. A method for manufacturing a magnetic recording medium, comprising:
    a filler deposition step of depositing a filler for filling concave portions over a surface of an object to be processed, the object being provided with a magnetic recording layer having a predetermined concavo-convex pattern;
    a cladding deposition step of depositing a cladding over the filler; and
    a flattening step of removing an excess part of the filler and the cladding above the magnetic recording layer for flattening, by using a dry etching method having a lower etching rate to the cladding than to the filler, wherein
    at least in some of the convex portions of the filler, the filler is exposed from the cladding at side portions of the convex portions faster than upper surface portions of the convex portions in the flattening step.

10. The method for manufacturing a magnetic recording medium according to claim 9, wherein
    the filler deposition step is preceded by a stop film deposition step of depositing a stop film over the magnetic recording layer, the stop film having an etching rate lower than that of the filler with respect to the dry etching method in the flattening step.

11. A method for manufacturing a magnetic recording medium, comprising:
    a filler deposition step of depositing a filler for filling concave portions over a surface of an object to be processed, the object being provided with a magnetic recording layer having a predetermined concavo-convex pattern;

a cladding deposition step of depositing a cladding over the filler; and a flattening step that includes:

a first flattening step of exposing the filler partially while flattening the surface of the object to be processed by using a dry etching method; and a second flattening step of removing an excess part of the filler and the cladding above the magnetic recording layer for flattening, by using a dry etching method having a lower etching rate to the cladding than to the filler, wherein at least in some of the convex portions of the filler, the filler is exposed from the cladding at side portions of the convex portions faster than upper surface portions of the convex portions in the flattening step.

12. The method for manufacturing a magnetic recording medium according to claim 11, wherein the dry etching method used in the first flattening step has a higher etching rate to the cladding than that used in the second flattening step.

13. The method for manufacturing a magnetic recording medium according to claim 11, wherein:

a dry etching method applying a process gas to the surface of the object to be processed is used the first flattening step and the second flattening step for flattening; and the incident angle of the process gas with respect to the surface of the object to be processed is adjusted to adjust the etching rates to the filler and the cladding.

14. The method for manufacturing a magnetic recording medium according to claim 11, wherein the etching rates to the filler and the cladding are adjusted by using different types of process gases in the first flattening step and the second flattening step.

15. The method for manufacturing a magnetic recording medium according to claim 11, wherein the filler deposition step is preceded by a stop film deposition step of depositing a stop film over the magnetic recording layer, the stop film having an etching rate lower than that of the filler with respect to the dry etching method in the second flattening step.

16. The method for manufacturing a magnetic recording medium according to claim 11, wherein reactive ion etching is used in the first flattening step.

* * * * *